No. 835,326. PATENTED NOV. 6, 1906.
L. ROY.
CULTIVATOR.
APPLICATION FILED AUG. 11, 1906.
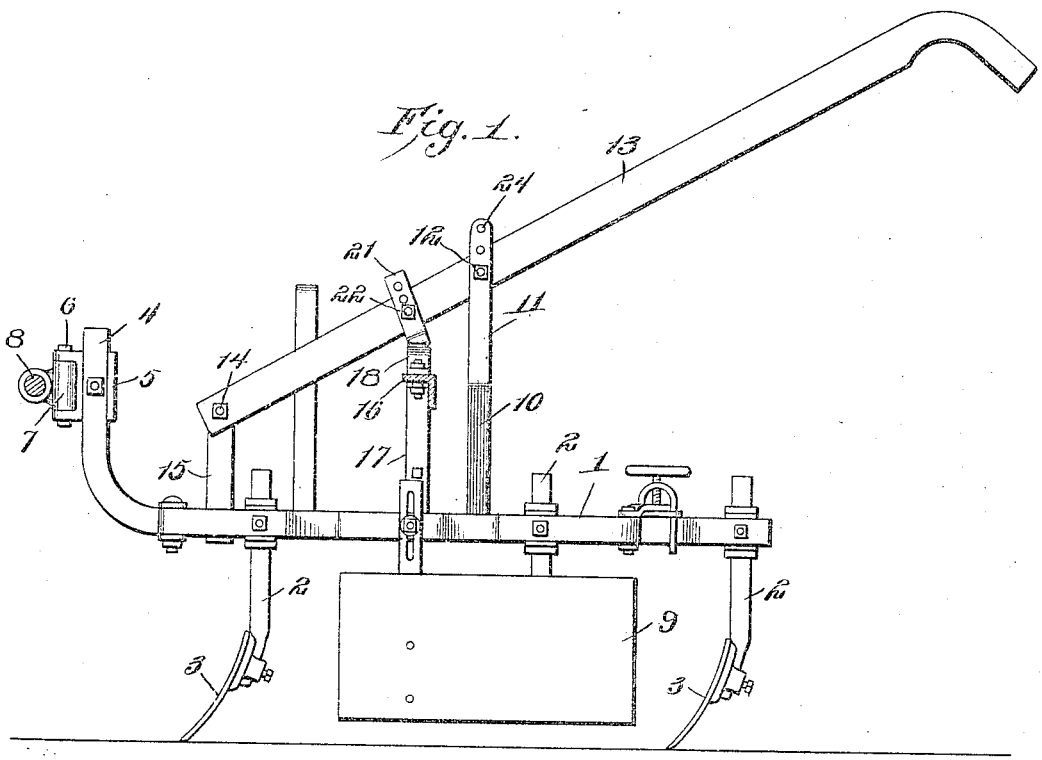
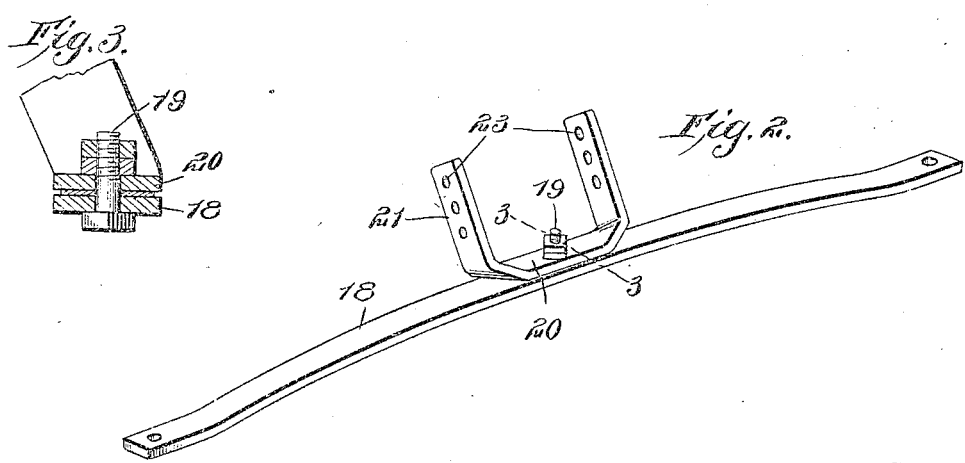
Witnesses
Louis R. Heinrichs
F. A. Elmore
Inventor
Louis Roy
By Victor J. Evans
Attorney

UNITED STATES PATENT OFFICE.

LOUIS ROY, OF CONTINENTAL, OHIO.

CULTIVATOR.

No. 835,326.  Specification of Letters Patent.  Patented Nov. 6, 1906.

Application filed August 11, 1906. Serial No. 330,247.

*To all whom it may concern:*

Be it known that I, LOUIS ROY, a citizen of the United States, residing at Continental, in the county of Putnam and State of Ohio, have invented new and useful Improvements in Cultivators, of which the following is a specification.

This invention relates to cultivators of the type embodying a plurality of sets or gangs of cultivating blades or shovels, being designed especially for use in cultivating beets.

The invention is directed particularly to the manner of connecting the handles with the central gang-frame, and has for its objects to provide a comparatively simple connection which may be readily and inexpensively installed, one whereby the handles will be held rigidly in place, thus obviating lost side motion during the operation of guiding the machine, and one which insures efficient action of the handles in performing their function and obviates liability of the shovels being thrown to an improper position.

With these and other objects in view the invention comprises the novel features of construction and combination of parts more fully hereinafter described.

In the accompanying drawings, Figure 1 is a side elevation, partly in section, of a cultivator, showing the handle-bars connected therewith in accordance with the invention. Fig. 2 is a perspective view of the improved connecting devices. Fig. 3 is a detail sectional view taken on the line 3 3 of Fig. 2 and showing the parts on an enlarged scale.

Referring to the drawings, 1 designates the gang-frame, to which is connected a plurality of standards 2, equipped at their lower ends with cultivating blades or shovels 3, said frame being provided at its forward end with a vertical upturned portion or head 4, connected in a box 5, in turn pivoted for horizontal swinging movement, and by means of a vertical pivoting-bolt 6, to a bearing box or head 7, fixed on the axle 8, which in practice receives the transporting-wheels, (not shown,) it being understood in this connection that the complete cultivator embodies a plurality of the gang-frames 1, of which the central frame is shown hereinafter for purposes of illustration.

Fixed upon the frame 1, which carries a sheet-metal shield 9, is a vertical forked standard 10, presenting a pair of spaced side portions or arms 11, to each of which there is connected, by means of a transverse bolt 12, one of a pair of handle-bars 13, in turn connected at their forward ends, by means of a bolt 14, with a vertical member or post 15, fixedly sustained on the frame. The forking parts, which are old and well known, and therefore constitute no part of the present invention, may be of the usual or any appropriate construction and material.

Arranged above the frame 1 is an angle-iron cross-beam 16, to which the gang-frame 1 is connected by means of vertical braces 17, there being attached to the upper side of said beam, which, it will be understood, connects the series of gang-frames, an arched metal connecting member or bar 18, to the longitudinal center of which there is pivoted, by means of a vertical pivoting member or bolt 19 and to swing in a horizontal plane, a substantially U-shaped connecting member or yoke 20, presenting side portions or arms 21, to each of which one of the handle-bars 13 is attached by means of a transverse connecting-bolt 22, it being noted in this connection that each of the side arms 21 is provided with a plurality of vertically-spaced openings 23, any one of which may receive the adjacent bolt 22, and that the side portions 11 of the standard 10 are similarly provided each with a plurality of vertically-spaced openings 24 to receive the adjacent connecting-bolt 12, whereby an adjustment of the parts may be effected for varying the elevation of the rear ends of the handles 13.

In practice the cultivator is guided in its travel over the ground by means of the handle-bars 13, it being noted that owing to the bars being connected at the points 12 and 14 they will be held rigidly on the central frame 1 and will in operation be free from lost side motion in manipulating the cultivator. In action the gangs may swing laterally in a horizontal plane, owing to the pivotal connections 6 with the axle, and during such movement the series of gangs will move in unison, owing to the connection made between them by means of the bar 16, which latter will be susceptible of swinging movement on the pivot 19, thus to insure proper travel of the blades 3 relative to the rows being cultivated. It may be mentioned in this connection that in devices of this class now in general use there is grave liability of the central gang being tilted under the action of the handle-bars, thereby throwing the shovels at one side of the row a greater depth into the ground than those at the other side. Under my improved means for connecting the gangs with the handle-bars this objection is wholly overcome, and the gangs will not only travel properly with relation to the rows, but may be readily guided in following rows which are not perfectly straight.

Having thus described my invention, what I claim is—

In a device of the class described, a gang-frame, cultivating-blades carried thereby, a standard arising vertically from the frame, a post carried by the frame at a point in advance of the standard, handle-bars connected at their forward ends with the post and between their ends to the standard, a cross-beam arranged above and connected with the frame, an arched connecting-bar attached to the beam, a connecting-yoke pivoted on the bar, and means for attaching the handles to the yoke.

In testimony whereof I affix my signature in presence of two witnesses.

LOUIS ROY.

Witnesses:
J. W. DELLINGER,
FRANK CALKITT.